United States Patent Office 3,166,605
Patented Jan. 19, 1965

3,166,605
REARRANGEMENT OF TERMINAL POLY-
ACETYLENES
John H. Wotiz and Charles G. Parsons, Mentor, Ohio,
assignors to Diamond Alkali Company, Cleveland,
Ohio, a corporation of Delaware
No Drawing. Filed Sept. 7, 1960, Ser. No. 54,337
5 Claims. (Cl. 260—678)

This invention relates to a new and improved method of rearranging terminal acetylenic bonds in acetylenic hydrocarbons, i.e., 1-alkynes and α, ω-polyynes, novel products obtained thereby, and their application.

More particularly, the present invention deals with an improved process for the rearrangement of 1-alkynes to 1,2-alkadienes and 2-alkynes. For example,

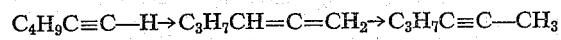

Another embodiment of the invention comprises the rearrangement of α, ω-polyacetylenes to transfer the unsaturation from the alpha to the beta and/or from the omega to the p.s.i. positions as illustrated by the following structures:

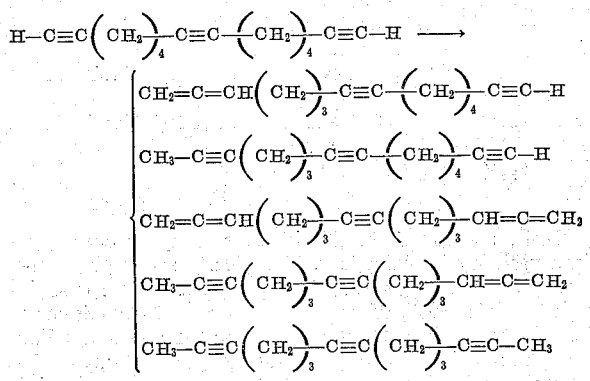

Another embodiment of the invention comprises rearrangement of polyynes formed in situ by the reaction of mixtures of mono- and dimetal acetylides with alkylene dihalide as indicated by the following equation:

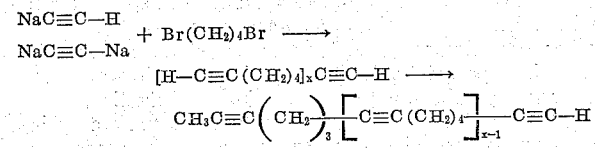

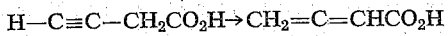

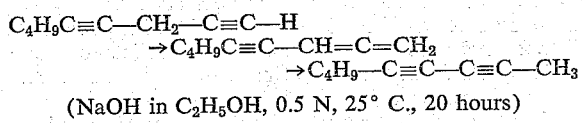

The rearrangement of certain acetylenic compounds is known; for example, compounds which contain an "activated" methylene group, i.e., compounds containing a methylene group separating an acetylenic group and another electron withdrawing group are known to rearrange as, for example, the following:

$$H-C\equiv C-CH_2CO_2H \rightarrow CH_2=C=CHCO_2H$$

($K_2CO_3$; 10% sol $H_2O$; 40° C., 3 hrs.)

E. R. H. Jones, G. H. Whitham and M. T. Whiting, J. Chem. Soc., 1954, 3201;

$$C_4H_9C\equiv C-CH_2-C\equiv C-H$$
$$\rightarrow C_4H_9C\equiv C-CH=C=CH_2$$
$$\rightarrow C_4H_9-C\equiv C-C\equiv C-CH_3$$

(NaOH in $C_2H_5OH$, 0.5 N, 25° C., 20 hours)

W. J. Gensler, J. Casella, J. Am. Chem. Soc., 80, 1376 (1958).

Monoacetylenic hydrocarbons, however, have been known to rearrange only under far more drastic conditions, e.g., an equilibrium mixture of 1-pentyne, 1,2-pentadiene and 2-pentyne is established in 3 hours at 175° C. using 3.8 N alcoholic KOH or in 24 hours at 125° C. in the presence of 3 N alcoholic KOH (J. Am. Chem. Soc., 73, 1273 (1951)). It is noted that such rearrangements under the indicated conditions are accompanied by undesirable side-reactions such as polymerization and/or additions of alcohol to the unsaturated bonds in the molecule as evidenced from the fact that only 68–77% of the hydrocarbon can be recovered.

It is, therefore, a principal object of the present invention to provide a new and improved process for rearranging a terminal acetylenic bond in a linear non-conjugated acetylenic hydrocarbon.

A further object of the invention is to provide a new and improved process of rearranging 1-alkynes.

A still further object of the invention is the provision of a new and improved process for rearranging alpha, omega polyacetylenic hydrocarbons.

These and other objects and advantages of the invention will appear more fully from the following description thereof.

Broadly, the present invention comprises the method of rearranging a terminal acetylenic bond and a linear non-conjugated acetylenic hydrocarbon by contacting the compound with a base and anhydrous ammonia at a temperature within the range from −20° to 60° C., and the products obtained thereby.

It will be appreciated that the present invention contemplates treating either a previously formed pure or substantially pure or relatively crude polyacetylenic hydrocarbon to form a methyl terminated hydrocarbon and also contemplates formation of a linear polyacetylenic hydrocarbon by reaction of an alkylene dihalide with an acetylenic bond containing compound such as sodium mono- or diacetylide and/or sodium polyacetylide or other alkali metal acetylides as set forth in Serial No. 831,930, Adams and Wotiz, filed August 6, 1959, by carrying out such a reaction at a temperature within the range from −20° C. to 60° C. in the presence of a base.

The terms "base" and "basic catalyst" as used in the specification and claims are intended to be synonymous and to refer to various basic materials, preferably alkali metal amides, acetylides, or hydroxides, alkaline earth metal amides, acetylides, or hydroxides, and alkaline earth metal substituted acetylenic hydrocarbons such as an alkynyl-alkali metal, alkaline earth metal compounds, for example, octadiynyl sodium and sodium acetylide, e.g., mono- and/or di-sodium acetylide. The expression "alkali metal" as used in the specification and claims, is intended, of course, to refer to the various alkali metals, e.g., sodium, potassium, lithium, rubidium and cesium. Similarly, the term "alkaline earth metal" is intended to refer to various alkaline earth metals such as calcium, strontium, and barium. Hence, the foregoing definition of "base" or "basic catalyst" includes the amides, acetylides and hydroxides of each of the several alkali metals and alkaline earth metals. In this instance, both mono- and dialkali metal, alkaline earth metal and ammonium acetylides are contemplated, although at present sodium amide is a preferred basic catalyst.

The reaction advantageously is carried out in pressure resistant equipment. An autoclave or corresponding pressure reactor provided with temperature control and agitation means is satisfactory. The temperature range of −20° C. to 60° C., is critical in the sense that reaction temperatures substantially greater than 60° C., for example, 75° C. or 100° C., lead to the formation of undesired products in view of disadvantageous side reactions when a rearranged acetylenic bond-containing compound is desired. On the other hand, temperatures substantially below −20° C. require an inordinate amount of time so as to render such temperatures impractical in many instances, although otherwise at times such temperatures are not disadvantageous. The preferred temperature range at present is 0 to 30° C., a specifically preferred temperature being 25° C. The pressure in the autoclave or other pressure reactor is the autogeneous ammonia pressure with no necessity existing for modifying the naturally obtained pressure, typically of the order of about 100 to 500 p.s.i.g.

The proportions of the base or basic catalyst and the acetylenic compound to be rearranged can be varied and the quantities employed in a given instance depend to a large extent upon the nature of the compound to be treated, the particular product desired, time available for the reaction, use of and/or desire for possible by-products, and the like. In general, it is desirable to employ a stoichiometric excess of the polyyne over the basic catalyst such as sodium amide, such, for example, as a quantity within the molar ratio from about 1:1 to about 10:1, although in certain instances, particularly where the polyyne is formed in situ and directly converted to a rearranged product, it may be desirable to have an excess of the base in order to insure smooth over-all reaction to the desired product.

The present invention also comprises novel rearranged products illustrative of such by the following:

2,7,13,18-eicosatetrayne

H$_3$C—C≡C—(CH$_2$)$_3$—C≡C—(CH$_2$)$_4$—C≡C—(CH$_2$)$_3$—C≡C—CH$_3$ 2,7,12-tetradecatriyne

H$_3$C—C≡C—(CH$_2$)$_3$—C≡C—(CH$_2$)$_3$—C≡C—CH$_3$ 2,6-octadiyne

H$_3$C—C≡C—(CH$_2$)$_2$—C≡C—CH$_3$ 1,6-octadiyne

H—C≡C—(CH$_2$)$_3$—C≡C—CH$_3$ 1,7,12-tetradecatriyne

H—C≡C—(CH$_2$)$_4$—C≡C(CH$_2$)$_3$—C≡C—CH$_3$ 1,7,13,18-eicosatetrayne

H—C≡C—(CH$_2$)$_4$—C≡C—(CH$_2$)$_4$—C≡C—(CH$_2$)$_3$—C≡C—CH$_3$

Compounds of this invention are useful in various applications, including pesticidal uses. As used in the specification and claims, the terms "pesticide," "pests," and "pesticidal" are intended to refer to the killing and/or controlling of the growth of plants, nematodes, bacteria, microorganisms, fungi, or the like. Thus, it will be appreciated that applications commonly termed bactericidal, nematocidal, herbicidal, fungicidal, or the like, are contemplated. Other uses of compounds of this invention include applications as polymers, solid rocket fuel components, e.g., binders, as coatings, films, fibers, intermediates, polymerization catalyst, high energy fuels, or fuel components, rocket fuel starters, plasticizers, stabilizers and the like.

As indicated, compounds of this invention generally can be prepared by reacting with a base a linear non-conjugated α, ω polyyne hydrocarbon either as such or as prepared when an alkylene dihalide is reacted with a dimetal acetylide or polyacetylide and/or mixtures thereof with corresponding monometal actylides and polyacetylides as described and claimed in Ser. No. 831,930, filed August 6, 1959, and Ser. No. 769,583, filed October 27, 1958, now U.S. Patent No. 3,052,734, wherein the preparation of various hydrogen-terminated, linear polyynes of the following type is described in detail, which description is hereby incorporated and made a part hereof:

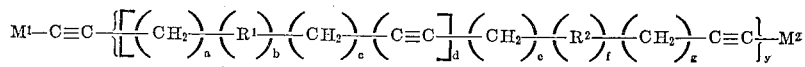

wherein M$^1$ and M$^2$ in this instance preferably, but not necessarily, are hydrogen and the other elements are as defined in Ser. No. 831,930.

Illustrative of the foregoing type of polyacetylenic compounds useful as starting materials for the production of compounds of this invention, either as such, or during their preparation, are the following:

1,9,17-octadecatriyne
   H—C≡C—(CH$_2$)$_6$C≡C—(CH$_2$)$_6$C≡C—H
1,8,15-hexadecatriyne
   H—C≡C—(CH$_2$)$_5$C≡C—(CH$_2$)$_5$C≡C—H
1,7,13-tetradecatriyne
   H—C≡C—(CH$_2$)$_4$C≡C—(CH$_2$)$_4$C≡C—H
1,6,11-dodecatriyne
   H—C≡C—(CH$_2$)$_3$C≡C—(CH$_2$)$_3$C≡C—H
1,6,11,16-heptadecatetrayne
   H—C≡C—(CH$_2$)$_3$C≡C—(CH$_2$)$_3$C≡C—(CH$_2$)$_3$C≡C—H
1,7,13,19-eicosatetrayne
   H—C≡C—(CH$_2$)$_4$C≡C—(CH$_2$)$_4$C≡C—(CH$_2$)$_4$C≡C—H
1,8,15,22-tricosatetrayne
   H—C≡C—(CH$_2$)$_5$C≡C—(CH$_2$)$_5$C≡C—(CH$_2$)$_5$C≡C—H
1,9,17,25-hexacosatetrayne
   H—C≡C—(CH$_2$)$_6$C≡C—(CH$_2$)$_6$C≡C—(CH$_2$)$_6$C≡C—H
1,10,19,28-nonacosatetrayne
   H—C≡C—(CH$_2$)$_7$C≡C—(CH$_2$)$_7$C≡C—(CH$_2$)$_7$C≡C—H
1,7,13,19,25-hexacosapentayne
   H—C≡C—(CH$_2$)$_4$C≡C—(CH$_2$)$_4$C≡C—(CH$_2$)$_4$C≡C—(CH$_2$)$_4$C≡C—H While compounds of this invention may be employed in a variety of applications, biologically active or otherwise, when employed as biologically-active materials it will be understood, of course, that such compounds may be utilized in diverse formulations, both liquid and solid, including finely-divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically-active materials such as other acetylenically-unsaturated compounds, organic phosphate pesticides, fertilizers, chlorinated hydrocarbon insecticides, foliage and soil fungicides and the like.

Solid compositions of the invention are preferably in the form of wettable powders and are compounded to give homogeneous free-flowing powders by admixing the active ingredient with finely-divided solids, preferably natural clays, diatomaceous earth, synthetic fine silica, or flours, such as walnut shell, wheat, redwood, soya bean, cotton seed flours and other inert solid conditioning agents or carriers of the kind conventionally employed in preparing pest control compositions in solid or liquid form.

Even more preferable among solid compositions are granules or pellets when the application is primarily to the soil. Granules may be prepared by inpregnating granular diluents such as granular attaclay, or may be made by first extending powdered solid with powdered diluent and subsequently granulating. Pellets can be made by extruding moistened, powdered mixtures under high pressure through dies.

Liquid compositions of the invention are prepared in the usual way by mixing the active ingredient with a suitable liquid diluent medium. The resulting composition can be in the form of either a solution or suspension of the active ingredient.

Compositions of the invention, whether in the form of solids or liquids, preferably also include a surface active agent of the kind sometimes referred to in the art as a wetting, dispersing or emulsifying agent. These agents, which will be referred to hereinafter more simply as surface active agents, cause the compositions to be easily dispersed in water to give aqueous sprays which for the most part constitute a desirable composition for application.

The surface active agents employed can be of the anionic, cationic or non-ionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955).

Generally, the surface active agent will not comprise more than about 5% to 15% by weight of the composition depending, of course, upon the particular surface active agent, the system in which it is placed, and the result desired, and in certain compositions, the percentage will be 1% or less. Usually the minimum lower concentration will be 0.1%.

The compositions of this invention can be applied as a spray, a granule or as a dust to the locus or area to be treated. Thus, the compositions can be applied as aqueous foliar sprays, but can also be applied as sprays or as granules directly to the surface of the soil. Alternatively, the dried powdered composition can be dusted directly on the plants or on the soil.

The active compound is, of course, applied in an amount sufficient to exert the desired action. The amount of the active ingredient present in the compositions as actually applied will vary with the manner of application, the particular purpose for which control is sought, the purpose for which the application is being made, and like variables. In general, the compositions as applied in the form of a spray or a granule will contain from about 0.5% to 85% by weight of the active ingredient.

Fertilizer materials, herbicidal agents and other pest control agents such as insecticides and fungicides can be included in the compositions of the invention if desired.

The term "carrier" as employed is intended to refer broadly to materials constituting a major proportion of a biologically active or other formulation and, hence, includes finely-divided materials, both liquids and solids, as aforementioned, generally used in such application.

In order that those skilled in the art may more completely understand the present invention and the preferred methods by which the same may be carried into effect, the following specific examples are offered.

EXAMPLE I

A one liter autoclave is cooled in a Dry Ice-acetone mixture (−78° C.) and 500 ml. of anhydrous ammonia (B.P. −33° C.), 3.9 g. (0.1 mole) of $NaNH_2$ and 41 g. (0.5 mole) of hexyne-1 are introduced. The autoclave is sealed and the temperature raised to and maintained at 25° C. The contents are stirred for 94 hours under an autogeneous ammonia pressure of about 160 p.s.i.g.

To isolate the products, the reactor is cooled (Dry Ice-acetone) to −33° C. and opened. To destroy the $NaNH_2$ and/or the alkynyl sodium and eliminate the ammonia, the reactor contents are diluted with 500 ml. of water. This forms two layers. The desired products are in the organic layer which is separated from the basic aqueous layer. The organic layer is purified by washing with two 10 ml. portions of water, dried over anhydrous $CaSO_4$ (Drierite), filtered, and distilled. The fraction which boils from 72° to 85° C. at atmospheric pressure weighs 32.9 g. which is 91% of the weight of the organic starting material. The result of infrared and vapor chromatographic analysis indicate that the fraction consists of 21.8% of hexyne-1 (B.P. 72° C.), 0.6% of hexadiene-1,2 (B.P. 75° C.), and 77.6% of the rearranged product hexyne-2 (B.P. 84° C.). Therefore, the actual yield of hexadiene-1,2 is 0.2 g. (0.5%) and the yield of hexyne-2 is 29 g. (71%), and the recovered hexyne-1 weighs 8.2 g. (22% recovery).

EXAMPLE II

To illustrate that reaction time is a factor in the relative amounts of rearranged products obtained, Example I is repeated with the exception that the reaction time is varied. The results are as follows:

| Reaction Time (Hours) | $C_4H_9C\equiv C-H$ Percent | $C_3H_7CH=C=CH_2$ Percent | $C_3H_7C\equiv C-CH_3$ Percent |
|---|---|---|---|
| 0 | 100 | 0 | 0 |
| 4 | 81 | 1.0 | 19.0 |
| 6 | 70.2 | 0.9 | 28.9 |
| 22 | 61.0 | 0.8 | |
| 30 | 50.0 | 0.7 | 49.3 |
| 94 (Example I) | 21.8 | 0.6 | 77.6 |

EXAMPLE III

To illustrate that temperatures in excess of 60° C. have an adverse effect on the amount of rearranged product obtained, Example I is repeated except that the reaction is run for 15 hours at 75° C. The amount of material boiling higher than 85° C., weight 8.6 g., which is 21% of the weight of the starting organic material. The fraction boiling from 72° to 85° C. contains 64% of hexyne-1.

EXAMPLE IV

To illustrate that the relative amounts of $NaNH_2$ and $C_4H_9C\equiv C-H$ employed affect the relative amounts of rearranged products obtained, Example I is repeated with the following changes: The amount of $NaNH_2$ used is 1.95 g. (0.05 mole) which corresponds to a 10 to 1 molar ratio of hexyne-1 to $NaNH_2$. After 94 hours of reaction at 25° C., the weight of material that boils from 72° to 85° C. is 39 g. which is 95% of the weight of starting organic material. This fraction contains 51.0% of hexyne-1, 0.4% of hexadiene-1,2, and 48.1% of hexyne-2. Therefore, the actual recovery of hexyne-1 is 20 g. (48.8%), the yield of hexadiene-1,2 is 0.2 g. (0.4%), and hexyne-2 is 18.8 g. (45.8%).

EXAMPLE V

To illustrate that reaction time is a factor in the relative amounts of rearranged products obtained, Example IV is repeated with varying reaction times. The results are as follows:

| Reaction Time (Hours) | $C_4H_9C\equiv C-H$ Percent | $C_3H_7CH=C=CH_2$ Percent | $C_3H_7C\equiv C-CH_3$ Percent |
|---|---|---|---|
| 0 | 100 | 0 | 0 |
| 27 | 75.2 | 0.5 | 24.3 |
| 50 | 60.8 | 0.5 | 38.7 |
| 94 (Example IV) | 51.0 | 0.4 | 48.1 |

EXAMPLE VI

Further to illustrate that the relative amounts of $NaNH_2$ and $C_4H_9C\equiv C-H$ have an effect on the relative amounts of rearranged products, Example I is repeated with the exception that 1.95 g. (0.25 mole) of $NaNH_2$ and 20.5 g. (0.25 mole) of $C_4H_9C\equiv C-H$ (a 1:1 molar ratio) is used and the reaction time is 169 hours. The fraction that distills at 72° to 85° C. weighs 19 g. which is 93% of the starting organic material. This fraction contains 86.9% of hexyne-1, 1.4% of hexadiene-1,2, and 12.2% of hexyne-2.

EXAMPLE VII

To illustrate that the main product in such rearrangements is the 2-alkyne, e.g., hexyne-2, Example I is repeated with the following changes: Hexyne-2 (25 g., 0.305 mole) is treated with $NaNH_2$ (2.38 g., 0.061 mole) for 162 hours. The resulting fraction that boils from 72° to 85° C. weighs 24 g. and consists of 5.2% of hexyne-1, 2.0% of hexadiene-1,2, and 92.7% of hexyne-2.

EXAMPLE VIII

To illustrate the rearrangement of an alpha,omega-diacetylene, 1,7-octadiyne is treated with $NaNH_2$. A one liter autoclave is cooled in a Dry Ice-acetone mixture (−78° C.) and 500 ml. of anhydrous ammonia, 53 g. (0.5 mole) of 1,7-octadiyne and 3.9 g. (0.1 mole) of $NaNH_2$ are introduced. The autoclave is sealed and the contents stirred at 25° C. for 18 hours. The temperature is raised to 60° C. for 2 hours and the infrared spectrum analysis shows the presence of —C≡C—H,

—CH=C=CH$_2$, and —C≡C—CH$_3$. After additional stirring at 25° C. for 18 hours, the autoclave is vented, the ammonia evaporated and the residue treated with 100 ml. of water. Two layers are formed. The organic portion is a dark red-brown liquid. On distillation, 2,6-octadiyne, B.P. 90° C. at 60 mm. Hg, M.P. 28° C., is separated.

EXAMPLE IX

To illustrate that rearrangement of 1,7-octadiyne,

H—C≡C—(CH$_2$)$_4$C≡C—H can be brought about by a sodium acetylide, a one liter autoclave is charged with 500 ml. of anhydrous ammonia (B.P. −33° C.) and 10 g. (0.25 mole) of $NaNH_2$. The suspension is saturated with acetylene which creates in situ 0.25 mole of NaC≡C—H. 50 g. (0.47 mole) of 1,7-octadiyne is then added, the autoclave sealed, and the temperature raised to 50° C. under an autogeneous ammonia pressure of 300 p.s.i.g. After stirring for 18 hours, infrared spectroscopic analysis of a sample shows the presence of CH$_2$=C=CH, CH$_3$C≡C— as well as the

H—C≡C— present in the starting material.

EXAMPLE X

To illustrate that the rearrangement of an alpha,omega polyacetylene can be brought about by a sodium acetylide in the presence of NaCl, Example IX is repeated with the exception that 58 g. (1 mole) of NaCl is added. The results are the same as in Example IX.

EXAMPLE XI

To illustrate the necessity of an anhydrous system, an autoclave is charged with 500 ml. of anhydrous ammonia (B.P. −33° C.), 10 g. of 50% aqueous solution of NaOH, and 50 g. (0.47 mole) of 1,7-octadiyne. The autoclave is sealed and the temperature raised to 60° C. Stirring is continued for 24 hours. Infrared spectroscopic analysis of a sample shows that no rearrangement takes place.

EXAMPLE XII

*Preparation of 2,7,13,18-eicosatetrayne*

CH$_3$C≡C(CH$_2$)$_3$C≡C(CH$_2$)$_4$C≡C(CH$_2$)$_3$C≡C—CH$_3$

A one gallon autoclave is charged with 2.5 liters of liquid ammonia (B.P. −33° C.), 10 g. (0.25 mole) of $NaNH_2$, and 266 g. (1.0 mole) of 1,7,13,19-eicosatetrayne. The reactor is sealed and the contents stirred at about 25° C. (170 p.s.i.g. autogeneous NH$_3$ pressure) for 72 hours. The reactor is opened, the ammonia vented and evaporated. The residue is treated with 500 ml. of water, and 500 ml. of ethyl ether. The desired product is in the ether layer which is separated, washed with two 50 ml. portions of water, dried over Drierite,[1] filtered and the filtrate distilled. The fraction that boils from 150° to 165° C. at 0.1 mm. Hg weighs 245 g. and partly solidifies. Purification by crystallization from a 1:1 mixture of petroleum ether-ethyl ether yields 80 g. of the desired 2,7,13,18-eicosatetrayne, M.P. 43° to 44° C. The results of chemical analysis indicate formation of the desired

C$_{20}$H$_{26}$ and are as follows:

| Element | Percent by Weight Found | Percent by Weight Calculated |
|---|---|---|
| C | 89.8 | 90.2 |
| H | 9.6 | 9.8 |

The results of infrared spectroscopic analysis show that this solid is free of compounds containing a terminal triple bond.

The mother liquor from the above crystallization is freed of low boiling solvent and weights 94 g. It is analyzed by vapor chromatographic means and by infrared spectroscopy. It contains three components, i.e., 10.1 g. of the starting 1,7,13,19-eicosatetrayne (3.8% recovery), and 30 g. of the above-described 2,7,13,18-eicosatetrayne which brings the total yield to 110 g. (41.5% yield). The third component weighs 59 g. (22% yield) and is identified as 1,7,13,18-eicosatetrayne,

H—C≡C—(CH$_2$)$_4$C≡C(CH$_2$)$_4$C≡C(CH$_2$)$_3$C≡C—CH$_3$

EXAMPLE XIII

*Preparation of 2,7,12-tetradecatriyne*

CH$_3$C≡C(CH$_2$)$_3$C≡C(CH$_2$)$_3$C≡C—CH$_3$

A one gallon autoclave is charged with 2.5 liters of anhydrous liquid ammonia (B.P. −33° C.), 13 g. (0.33 mole) of $NaNH_2$, and 250 g. (1.33 mole) of 1,7,13-tetradecatriyne. The autoclave is sealed and the contents stirred at room temperature (about 25° C.) for 112 hours, under an autogeneous ammonia pressure of about 170 p.s.i.g. The reactor is opened, the ammonia vented and evaporated, and the residue washed with 500 ml. of water and 500 ml. of ethyl ether. The desired product is in the ether layer which is separated, washed with two 50 ml. portions of water, dried over Drierite, and distilled. The fraction which boils at 80° to 85° C. at 0.05 mm. Hg weighs 236 g. and partly solidifies. To isolate and purify the product, it is crystallized from a 1:1 mixture of petroleum ether-ethyl ether. The product which melts at 37° to 38° C. weighs 150 g. The results of chemical analysis indicate formation of the desired C$_{14}$H$_{18}$.

| Element | Percent by Weight Actual | Percent by Weight Calculated |
|---|---|---|
| C | 90.3 | 90.3 |
| H | 9.6 | 9.7 |

Infrared spectrum analysis confirms the indicated structure. The mother liquor from the above solid is freed of low boiling solvents and weighs 43 g. It is analyzed using vapor chromatography and infrared spectrum and found to contain four components. One component is the starting 1,7,13-tetradecatriyne (3.3 g. 1.3% recovery). Another component is the above-described 2,7,12-tetradecatriyne, 31.4 g. This brings the total yield to 181.4 g., 72% of theory.

---

[1] Anhydrous CaSO$_4$.

EXAMPLE XIV

*Preparation of novel products from the in situ rearrangement of alpha,omega-polyacetylenes*

A five gallon autoclave is charged with 3.5 gallons of anhydrous liquid ammonia (B.P. −33° C.) and 1875 g. (48 moles) of $NaNH_2$, while the temperature is kept below −33° C. by means of external cooling. Acetylene [807 liters (STP)—36 moles] is introduced which produces in situ a mixture of Na—C≡C—H and $$Na—C≡C—Na$$

in the molar ratio of 2:1. The autoclave is then sealed and the temperature raised to −20° C. Dichlorobutane [$Cl(CH_2)_4Cl$] 2920 g. (23 moles) is then forced into the reactor under pressure. The reaction is exothermic and the temperature is maintained near −20° C. by external cooling for an additional hour after the addition of the dichloride is completed. Stirring of the autoclave is then continued for 18 hours at room temperature (about 25° C.) under an autogeneous pressure of ammonia of about 170 p.s.i.g. The autoclave is then opened, the ammonia vented and evaporated. The residue is treated with 1 gallon of water which creates two layers. The desired products are in the organic layer which is separated, washed successively with three 200 ml. portions of water, dried over Drierite, filtered and the filtrate fractionally distilled. Aside from the non-rearranged and unidentified products, the desired rearranged products boil at the below-specified temperature. They are purified in most cases by crystallization from a 1:1 mixture of petroleum ether-ethyl ether.

(A) 1,6-octadiyne, $H—C≡C(CH_2)_3C≡C—CH_3$, B.P. 146° C., $n_D^{25}=1.4541$.

The results of chemical analysis indicate the presence of $C_8H_{10}$.

| Element | Percent by Weight Actual | Percent by Weight Calculated |
|---|---|---|
| C | 89.0 | 90.5 |
| H | 9.5 | 9.5 |

The found molecular weight is 103 whereas the calculated molecular weight is 106. Vapor chromatographic analysis shows it to be free of by-products and the infrared spectrum confirms the indicated structure.

(B) 2,6 - octadiyne, $CH_3—C≡C(CH_2)_2C≡C—CH_3$, B.P. 160° C., $n_D^{25}=1.4662$, M.P. 28° C.

The results of chemical analysis indicate the presence of $C_8H_{10}$.

| Element | Percent by Weight Actual | Percent by Weight Calculated |
|---|---|---|
| C | 89.9 | 90.5 |
| H | 9.7 | 9.5 |

The found molecular weight is 104 whereas the calculated molecular weight is 106. Vapor chromatographic analysis shows it to be free of by-products and the infrared spectrum confirms the indicated structure.

(C) 1,7,12-tetradecatriyne $$H—C≡C(CH_2)_4C≡C(CH_2)_3C≡C—CH_3$$

B.P. 79° C. at 0.08 mm. Hg, $n_D^{25}=1.4852$.

Results of chemical analysis confirm the presence of $C_{14}H_{18}$.

| Element | Percent by Weight Actual | Percent by Weight Calculated |
|---|---|---|
| C | 88.4 | 90.3 |
| H | 9.3 | 9.7 |

The found molecular weight is 182 whereas the calculate molecular weight is 186. The infrared spectrum confirms the indicated structure.

(D) 2,7,12-tetradecatriyne $$CH_3C≡C(CH_2)_3C≡C(CH_2)_3C≡C—CH_3$$

B.P. 108° C. at 1.0 mm. Hg, M.P. 37° to 38° C.

The results of chemical analysis confirm the presence of $C_{14}H_{18}$.

| Element | Percent by Weight Actual | Percent by Weight Calculated |
|---|---|---|
| C | 89.6 | 90.3 |
| H | 9.7 | 9.7 |

The results of vapor chromatographic analysis shows it to be free of by-products and the infrared spectrum confirms the indicated structure.

(E) 2,7.13,18-eicosatetrayne $$CH_3C≡C(CH_2)_3C≡C(CH_2)_4C≡C(CH_2)_3C≡C—CH_3$$

B.P. 165° C. at 0.1 mm. Hg, M.P. 43° to 44° C.

The results of chemical analysis indicate the presence of $C_{20}H_{26}$.

| Element | Percent by Weight Actual | Percent by Weight Calculated |
|---|---|---|
| C | 89.4 | 90.2 |
| H | 9.7 | 9.8 |

The calculated molecular weight is 240 whereas the found molecular weight is 253. The vapor chromatographic analysis shows it to be free of by-products and the infrared spectrum is consistent with the indicated structure.

EXAMPLE XV

*Preparation of 1,7,13-tetradecatriyne and 1,7,13,19-eicosatetrayne*

To a flask equipped with cooling means, stirrer, and condenser and containing 2½ to 3 liters of anhydrous liquid ammonia, 1.8 g. of ferric nitrate hydrate is added with stirring, followed by the addition of 2 g. of sodium metal. Dry air is then bubbled into the mixture for about 30 seconds to activate the catalyst and 137 g. of sodium is added at a rate which causes a brisk evolution of hydrogen. When no further hydrogen is evolved, the stirrer is speeded up to wash the flask walls free of spattered sodium. Acetylene is then added to the mixture until the milky suspension begins to clear, typically about ½ to 2 hours. 648 g. (3.0 mole) of tetramethylene dibromide is then added at a rate to retain a gentle reflux of liquid ammonia. Upon reaction completion, the ammonia is allowed to evaporate.

About 200 to 300 mls. of water is then added with caution and two layers form, i.e., an organic layer and an aqueous layer. These layers are extracted several times with 100 ml. portions of ethyl ether. The combined ether extracts are washed with dilute hydrogen chloride and dilute sodium carbonate aqueous solutions and dried over calcium sulfate. The ether is removed during distillation with 1,7,13-tetradecatriyne, $C_{14}H_{18}$, boiling at 111° to 112° C. at 1.0 mm. Hg and 1,7,13,19-eicosatetrayne, $C_{20}H_{26}$, boiling at 165° to 170° C. at 0.3 mm. Hg.

Preparation of the indicated triyne is indicated by the following elemental analytical data:

| Element | Percent by Weight Actual | Percent by Weight Calculated |
| --- | --- | --- |
| C | 89.2 | 90.2 |
| H | 9.6 | 9.8 |
| Molecular Wgt. | 188 | 186 |

Preparation of the desired tetrayne also is indicated by the following elemental analytical data:

| Element | Percent by Weight Actual | Percent by Weight Calculated |
| --- | --- | --- |
| C | 89.3 | 90.2 |
| H | 9.3 | 9.8 |
| Molecular Weight | 276 | 266 |

EXAMPLE XVI

*Panagrellus redivivus* nematodes are exposed to 1,7,12-tetradecatriyne in watch glasses (27 mm. diameter x 8 mm. deep) placed within a 9 cm. Petri dish. The glasses each receive 0.4 ml. of a test formulation (0.1 g. test compound, 4 ml. acetone, 2 ml. of stock emulsifier solution—0.5% Triton X–155 by volume—with sufficient distilled water added to obtain a total volume of 80 ml.) at 1250 p.p.m. 0.1 ml. of Panagrellus suspension is added to each glass, thus bringing the concentration down to 1000 p.p.m. Each watch glass contains 30 to 40 nematodes. At the end of 48 hours mortality counts are made. 1,7,12-tetradecatriyne causes a 100% nematode kill at 100 p.p.m. both with respect to contact action (100 p.p.m.) and fumigant action (0.1 mg.).

EXAMPLE XVII

Further to illustrate insecticidal activity, 1,7,12-tetradecatriyne[1] is tested against the German cockroach (*Blattella germanica*). 75 ml. of the formulation is poured into a 150 ml. beaker containing twenty 7 to 9 week old male roaches anesthetized with carbon dioxide. The formulation is poured in and out three times and the roaches immediately screened and drained on towel paper. Ten of the thus-treated roaches are then placed in each of two paper cups. After three days, all roaches are dead.

EXAMPLE XVIII

To illustrate fungicidal activity of 1,7,12-tetradecatriyne, inhibition of germination of *Sclerotium rolfsii* sclerotia, black blotting paper pads (2″ x 2″) are placed in the formulation of Example XVII diluted to place about 800 g. of test chemical on each pad. Twenty sclerotia are exposed to each pad in a sealed bottle at room temperature. After 48 hours, a 100% growth inhibition is observed. A 67% growth inhibition obtained using 2,7,12-tetradecatriyne.

EXAMPLE XIX

To illustrate nematocidal activity of 1,7,12-tetradecatriyne, the following test procedure is carried out. Composted greenhouse soil diluted by one-third with clean washed sand is placed in ½-gallon glazed crocks and infested with three to five grams of knotted or galled tomato roots. Treatment is accomplished by mixing intimately with the soil a drench formulation consisting of 4% acetone, 0.01% Triton X–155 emulsifier, 0.384% 1,7,12-tetradecatriyne in a total volume of 100 ml. of water, all of which is drenched on the test crock. After treatment at a rate of 256 lbs. per acre, all crocks are stored at 20° C. and covered with plastic to maintain moisture. Seven days after treatment, three seedling Bonny Best tomatoes are transplanted into each crock. After three weeks in the greenhouse, the plants are carefully removed from the soil and the roots inspected for nematode galls. A 100% nematode control is achieved at 246 lbs./acre and also in corresponding tests carried out at 128 lbs./acre and 64 lbs./acre, respectively.

EXAMPLE XX

Paired, fully expanded seed leaves excised from Tendergreen bean plants are dipped into a test formulation of 1,7,12-tetradecatriyne[1] and agitated until they are thoroughly wetted. The leaves are then dried. One leaf is placed in each of 5 oz. paper cups together with 10 randomly selected fourth instar larvae of the Mexican bean beetle (*Epilachna varivestis*). The cups are then covered with 9 cm. Petri dish covers. After three days at 70° F., mortality and feeding inhibition are determined. The results of such a procedure indicate a 100% mortality. Similar tests by immersing roaches (*Blattella germanica*) in the same formulation[1] indicate a 100% kill at 0.2%.

EXAMPLE XXI

Using the procedure of Example XX, 2,7,12-tetradecatriyne provides a 100% kill of the roaches at 0.2%, and a 75% kill of the Mexican bean beetles.

EXAMPLE XXII

Using he procedure of Example XVI, 2,7,12-tetradecatriyne provides an 87% kill via contact action at 100 p.p.m. and a 94% kill via fumigant action at 0.1 mg.

EXAMPLE XXIII

Sterile soil is infested with *Rhizoctonia solani* grown on a cornmeal sand medium. In order to obtain the desired inoculum potential in the test, two 250 ml. flasks containing a 10-day-old culture of the fungus are mixed per level flat of sterile soil. The infested soil is then replaced in small Dixie cups (4 oz. squat). Treatment of the soil is accomplished by drenching 25 ml. of the test formulation (2112 p.p.m. 2,7,12-tetradecatriyne, 5% by weight of acetone, and 0.01% by volume of Triton X–155) on the surface of the soil in duplicate cups. The amount of test chemical is equivalent to 128 lbs./acre. The surface area of the soil in the cups is 5.73 square inches so that it requires 0.414 mg. of test chemical per cup to achieve a rate of 1 lb./acre. After drenching, the cups are placed in a saturated atmosphere at 70° F. for 48 hours. At the end of this time, the fungus mycelium has completely overgrown the surface of the soil in the control cups. The effectiveness of the test chemical is determined by observing the cups and grading them on a scale from 0=complete inhibition of growth to 10= growth equivalent to that of the control. These grades are then expressed as percent control, 0% indicating no activity and 100% indicating complete inhibition of mycelial growth over the soil surface. Using this procedure, at the following rates of application, the indicated results are obtained.

| Concentration, lbs./acre: | Percent Control |
| --- | --- |
| 128 | 100 |
| 64 | 90 |
| 32 | 80 |
| 16 | 60 |

EXAMPLE XXIV

The soil around growing tomato plants is drenched

---

[1] 0.1 g. of 1,7,12-tetradecatriyne+4 ml. acetone+2 ml. (0.5% by volume Triton X–155 in water) diluted with distilled water to provide a final concentration of 0.2%—2000 p.p.m.

[1] 0.2% (2000 p.p.m.) 1,7,12-tetradecatriyne+4% acetone +0.01% Triton X–155+distilled water.

with a formulation [1] of 2,7,12-tetradecatriyne at a rate equal to 128 lbs./acre. Two weeks after such treatment the test plants are dead.

It is to be understood that although the invention has been described with specific reference to particular embodiments thereof, it is not to be so limited, since changes and alternations therein may be made which are within the full intended scope of this invention as defined.

What is claimed is:

1. The method of rearranging a terminal acetylenic bond in an acetylenic hydrocarbon consisting essentially of contacting said compound with a basic material selected from the group consisting of alkali metal amides, acetylides and hydroxides and alkaline earth metal amides, acetylides and hydroxides and anhydrous ammonia at a temperature within the range from $-20°$ to $60°$ C.

2. The method according to claim 1 wherein the hydrocarbon is a 1-alkyne.

3. The method according to claim 1 wherein the hydrocarbon is an alpha, omega-polyacetylenic hydrocarbon.

4. The method according to claim 3 wherein an in situ formed hydrocarbon is rearranged by means of an excess of said basic material over the amount required to produce the acetylenic hydrocarbon having the terminal acetylenic bond.

5. The method according to claim 1 wherein the reaction temperature is about $25°$ C.

References Cited in the file of this patent

UNITED STATES PATENTS

| 2,945,781 | Santmyer | July 19, 1960 |
| 2,947,660 | Hoffman | Aug. 2, 1960 |
| 2,947,795 | Keown | Aug. 2, 1960 |
| 2,952,718 | Kauer | Sept. 13, 1960 |
| 3,052,734 | Adams et al. | Sept. 4, 1962 |

OTHER REFERENCES

Egloff et al.; Isomerization of Pure Hydrocarbons (1942); Reinhold Pub. Co., No. 88, pages 286–7.

Henne et al.; Journal of the American Chem. Soc. (1945), vol. 67, pages 484–5.

---

[1] 0.1 g. 2,7,12-tetradecatriyne + 4 ml. acetone + 2 ml. of stock emulsifier solution (0.5% Triton X–155 in water) diluted with distilled water to 2000 p.p.m. of 2,7,12-tetradecatriyne.

UNITED STATES PATENT OFFICE
CERTIFICATE OF CORRECTION

Patent No. 3,166,605                           January 19, 1965

John H. Wotiz et al.

It is hereby certified that error appears in the above numbered patent requiring correction and that the said Letters Patent should read as corrected below.

Column 3, line 45, the structure should appear as shown below instead of as in the patent:

column 6, EXAMPLE II, in the table, fourth column, below "28.9" insert -- 38.2 --; column 10, lines 10 and 11, for "calculate" read -- calculated --; column 12, line 34, for "he" read -- the --.

Signed and sealed this 15th day of June 1965.

(SEAL)
Attest:

ERNEST W. SWIDER                        EDWARD J. Brenner
Attesting Officer                       Commissioner of Patents